No. 779,998. Patented January 10, 1905.

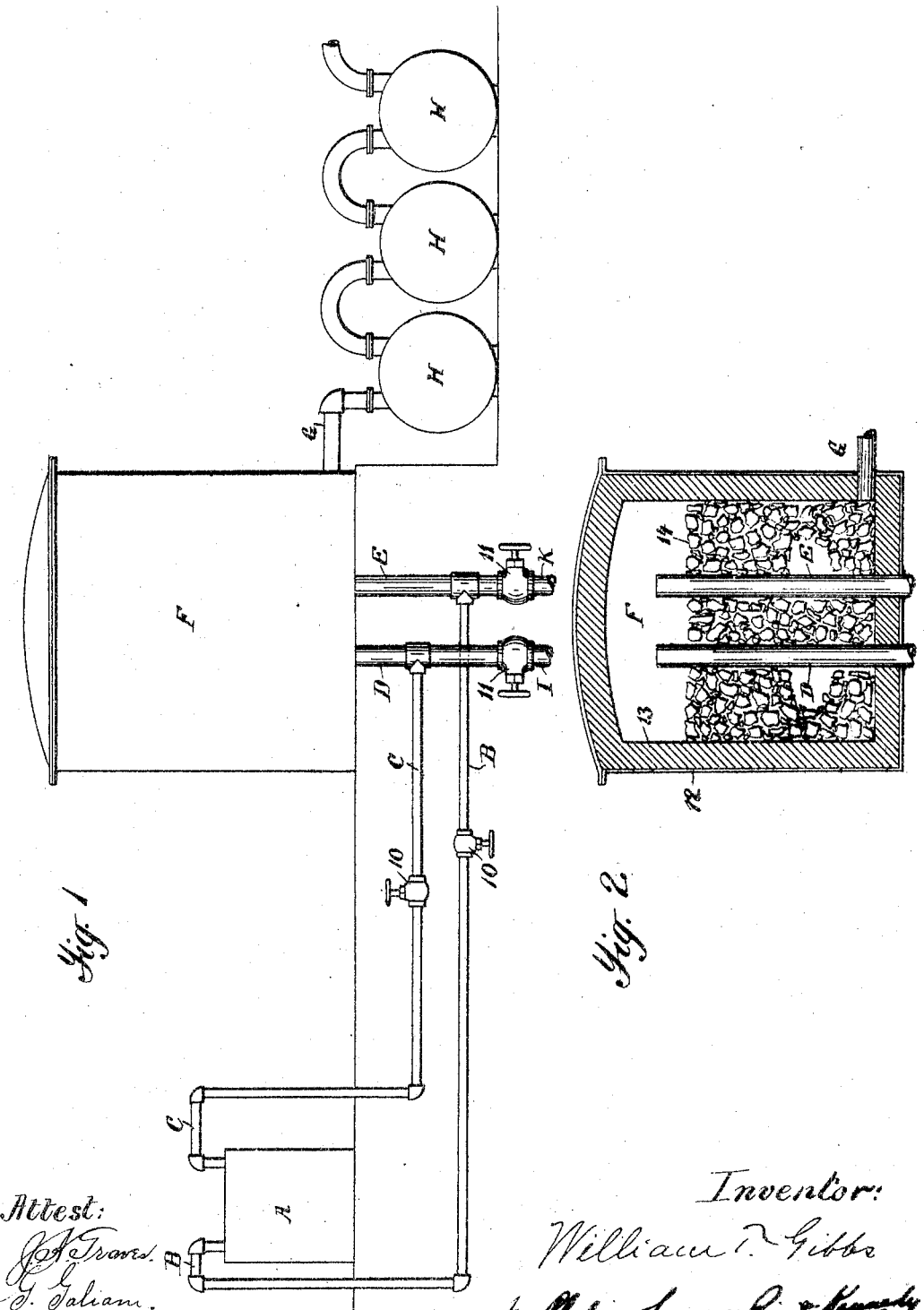

UNITED STATES PATENT OFFICE.

WILLIAM T. GIBBS, OF BUCKINGHAM, CANADA, ASSIGNOR TO THE ELECTRIC REDUCTION COMPANY, LIMITED, OF BUCKINGHAM, CANADA, A CORPORATION OF GREAT BRITAIN.

PROCESS OF MAKING HYDROCHLORIC ACID.

SPECIFICATION forming part of Letters Patent No. 779,998, dated January 10, 1905.

Application filed October 24, 1903. Serial No. 178,406.

*To all whom it may concern:*

Be it known that I, WILLIAM T. GIBBS, a subject of the King of Great Britain, residing at Buckingham, county of Ottawa, Province of Quebec, Canada, have invented certain new and useful Improvements in Methods of Combining Hydrogen and Chlorin Gases and Making Hydrochloric Acid, described and represented in the following specification and the accompanying drawings, forming a part of the same.

This invention relates to an improved method of combining hydrogen and chlorin gas, especially for the production of hydrochloric acid, by which danger of explosion is avoided and all the chlorin is combined, so that the objectionable escape of free chlorin is prevented.

I have discovered that it is possible to obtain complete combination of chlorin gas with hydrogen without any danger of explosion by heating one or both of the gases to a temperature above that at which combination of the two gases commences and then passing one gas through a jet or pipe in a continuous stream into an atmosphere of the other gas. Under these conditions quiet combustion commences at the instant the gases come into contact, and no mixture of the gases in an uncombined state is possible, so that no explosion can take place.

It is not essential that both gases be previously heated, and either gas may be delivered into an atmosphere of the other gas; but I preferably use an atmosphere of heated hydrogen into which the chlorin gas is passed, and I preferably supply to the atmosphere hydrogen gas in quantity slightly greater than is needed to combine with all the chlorin introduced. By thus using a slight excess of hydrogen gas I assure an absolutely complete combustion of the chlorin gas and avoid the possibility of the objectionable escape of or contamination of the hydrochloric acid by free chlorin. A slight escape of hydrogen is of no importance, as it is inexpensive, odorless, and does not contaminate the hydrochloric acid.

My invention may be carried into effect in any suitable manner by any suitable apparatus, and the hydrogen and chlorin may be supplied from any suitable source, and the hydrochloric-acid gas formed by the combination of the hydrogen and chlorin may be treated in any suitable absorbing or condensing apparatus.

I preferably use for combining the gases, however, a small brick-lined combustion-chamber, which is filled, preferably, with hydrogen heated to a temperature just approaching a dull-red heat, about 300° centigrade, and into this chamber I pass a stream of chlorin gas, which is preferably but not necessarily heated before contact with the hydrogen. I may use any suitable source of heat for maintaining the gas or gases at the necessary temperature, but preferably utilize the heat generated by the combustion of the gases themselves.

In the accompanying drawings I have shown for the purpose of illustration an apparatus suitable for carrying out my process in connection with the manufacture of hydrochloric acid, in which drawings—

Figure 1 shows diagrammatically a complete apparatus for the manufacture of hydrochloric acid, and Fig. 2 is a detail section of the combustion-chamber for combining the hydrogen and chlorin.

A is the supply of hydrogen and chlorin gas, which may be an electrolytic cell or series of electrolytic cells in which an aqueous solution of a suitable chlorid is undergoing electrolysis. This supply is connected by hydrogen and chlorin pipes B C with the corresponding pipes D E, which enter the combustion-chamber F from the bottom, in which combustion-chamber the gases are combined. G is the delivery-pipe from the combustion-chamber for the hydrochloric-acid gas formed by combining the hydrogen and chlorin, and H the absorbing or condensing apparatus, which is shown as the usual series of Woulfe's bottles, but which may be of any other suitable character.

The pipes B C are shown as provided with hand-valves 10, by which the supply of the two gases may be regulated or cut off. The pipes D E are also shown as extended downward below the pipes B C to form the heating supply-pipes I K, by which any hot inert gases, such as waste fuel-gases, may be admitted in starting the apparatus, these pipes I K being provided with valves 11, by which they may be closed.

The combustion-chamber F, as shown in Fig. 2, consists of a metal casing 12, completely lined with refractory brick 13 and containing a suitable filling 14, such as broken lumps of refractory stone, as quartz, which filling extends nearly to the top of the pipes D E. The pipes D E are preferably of refractory stoneware.

In commencing to operate the apparatus the valves 10 are closed and the valves 11 open, so as to admit heating-gases from the pipes I K through the pipes D E to the combustion-chamber, and this heating operation is continued until the pipes D E and the whole of the filling material 14 have attained the requisite temperature, which is preferably a very faint red heat. The heating-gases are then cut off by closing the valves 11, and the valve 10 on hydrogen-pipe B is opened to admit hydrogen gas from the supply A to the pipe D and the combustion-chamber F, and hydrogen gas is thus passed into the chamber until the atmosphere in the chamber consists solely of hydrogen. When pure hydrogen issues from the pipe G, the valve 10 on chlorin-pipe C is opened to feed chlorin gas slowly into the combustion-chamber through pipe E. Immediately on this chlorin gas coming in contact with the heated hydrogen gas in the upper part of the chamber F the combination of the two gases takes place quietly and completely with the evolution of considerable heat, and no explosion is possible, since mixture and combination are simultaneous. From the pipe G a continuous stream of hydrochloric-acid gas issues and is absorbed and condensed in the condenser, or the gas may be used in the gaseous state, if so desired.

I do not confine myself to any absolute proportions of the two ingoing gases; but, as above stated, I prefer to keep the hydrogen gas in the combustion-chamber F slightly in excess of that necessary to combine with the chlorin gas introduced, so as to avoid the danger of contaminating the hydrochloric acid produced with free chlorin or the objectionable escape of free chlorin from the apparatus.

In the apparatus shown and operating as described the chlorin gas is heated by passing through the pipe E within the heated refractory material 14 before its contact with the hydrogen; but it will be understood that the chlorin gas may be introduced into the hydrogen without previous heating, although it is preferable to heat both gases before contact.

Instead of using hot gases any other suitable source of heat may be used for bringing the temperature of the chamber up to the necessary point, and heat not generated by the combustion of the gases themselves may be used also in continuing the process.

What I claim is—

1. The method of combining hydrogen and chlorin gases, which consists in bringing them into contact in suitable proportions in a combustion-chamber, one or both of said gases being heated before contact to a temperature above that at which combustion of hydrogen and chlorin commences.

2. The method of combining hydrogen and chlorin gases, which consists in bringing the hydrogen and chlorin gases into contact, with the hydrogen gas in excess of that which is required to chemically combine with the chlorin gas introduced, one or both of said gases being heated before contact to a temperature above that at which combustion of hydrogen and chlorin commences.

3. The method of making hydrochloric acid, which consists in bringing hydrogen and chlorin gases into contact, one or both of said gases being heated before contact to a temperature above that at which combustion of hydrogen and chlorin commences, and absorbing or condensing the hydrochloric-acid gas thus formed.

4. The method of making hydrochloric acid, which consists in bringing hydrogen and chlorin gases into contact, with the hydrogen gas in excess of that which is required to chemically combine with the chlorin gas introduced, one or both of said gases being heated before contact to a temperature above that at which combustion of hydrogen and chlorin commences, and absorbing or condensing the hydrochloric-acid gas thus formed.

In testimony whereof I have hereunto set my hand in the presence of two subscribing witnesses.

WILLIAM T. GIBBS.

Witnesses:
 FRED. J. HAMBLY,
 EDGAR ROY.